United States Patent

[11] 3,618,981

| [72] | Inventors | Maurice B. Leising<br>Clawson;<br>Gerald L. Holbrook, Troy; Douglas A. Larson, Sterling Heights; John M. Stilson, Troy, all of Mich. |
|---|---|---|
| [21] | Appl. No. | 873,769 |
| [22] | Filed | Oct. 31, 1969 |
| [45] | Patented | Nov. 9, 1971 |
| [73] | Assignee | Chrysler Corporation<br>Highland Park, Mich. |

[54] INFLATABLE DEVICE
8 Claims, 6 Drawing Figs.

[52] U.S. Cl................................................. 280/150 AB,
23/281, 55/337, 55/455, 102/39
[51] Int. Cl.......................................................... B60r 21/08
[50] Field of Search............................................ 280/150
AB; 23/281; 55/302, 455, 337; 102/39; 9/2 A, 11 A, 321

[56] References Cited
UNITED STATES PATENTS

| 295,322 | 3/1884 | Albrecht | 55/455 X |
|---|---|---|---|
| 2,850,291 | 9/1958 | Ziccardi | 280/150 AB |
| 2,985,104 | 5/1961 | Fox | 102/39 |
| 3,066,014 | 11/1962 | White et al. | 23/281 |
| 3,296,779 | 1/1967 | Daman et al. | 55/337 |
| 3,336,045 | 8/1967 | Kobori | 280/150 AB |
| 3,473,824 | 10/1969 | Carey et al. | 280/150 AB |
| 3,477,740 | 11/1969 | Hass | 280/150 AB |
| 3,516,685 | 6/1970 | Goetz | 280/150 AB |
| 3,532,359 | 10/1970 | Teague et al. | 280/150 AB |
| 3,532,360 | 10/1970 | Leising et al. | 280/150 AB |

Primary Examiner—Benjamin Hersh
Assistant Examiner—John A. Pekar
Attorney—Harness, Talburtt and Baldwin ABSTRACT: Inflatable bag device including a gas generator containing an ignitable propellant, a bag adapted to be inflated by gas released from the propellant, a trapping device for inhibiting movement of solid or molten material from the gas generator to the interior of the bag, and an expansible chamber for filtering and diffusing nongaseous matter which passes through said trapping device.

INVENTORS
Maurice B. Leising
Douglas A. Larson
John M. Stitson
By Gerald L. Holbrook
Harness, Talburtt & Baldwin
ATTORNEYS INVENTORS.
Maurice B. Leising
Douglas A. Larson
John M. Stilson
Gerald L. Holbrook
BY Harness, Talbutt & Baldwin
ATTORNEYS.

INFLATABLE DEVICE

BACKGROUND OF THE INVENTION

This invention relates to a gas generator and inflatable bag device, particularly adapted for use in automotive vehicles, and more particularly to a device for preventing propellant emanating in a nongaseous state from the gas generator from reaching an inflatable bag or gas confining member.

Different types of gas source or generator and inflatable bag devices particularly adapted for use in automotive vehicles are known. For example, some of these devices employ a sealed cylinder of compressed gas connected directly or by a conduit to an inflatable bag mounted on the interior of the vehicle. A sensing device is conventionally provided for sensing rapid deceleration or change in velocity of the vehicle. Upon a predetermined change in vehicle velocity, such as upon impact with another object, the sensing device causes a signal to be sent to an actuating device for breaking the seal on the cylinder to release the gas to the bag. The latter inflates and provides a cushion against which an occupant may be thrown by the impact.

Another type of generator comprises a housing holding a supply of propellant adapted to be ignited in response to a signal indicative of a collision of predetermined magnitude. The propellant undergoing chemical reaction releases gas to expand the inflatable bag. A device of this general type is disclosed in copending U.S. Pat. application Ser. No. 764,333, filed July 22, 1968, now U.S. Pat. No. 3,532,358, issued Oct. 6, 1970.

The propellant undergoes combustion to release the inflating gas, and it is highly desirable to keep the burning particles or masses of propellant from entering the bag being inflated. It is also desirable to keep all other particles from entering or being propelled with high velocity into the bag. The present invention is directed toward a device for inhibiting such occurrences.

SUMMARY OF THE INVENTION

Briefly, the invention comprises a gas generator, an inflatable bag, and means for inhibiting movement of certain materials into said bag.

One of the primary objects of this invention is to provide a device for inflating a bag which enhances combustion of the propellant which releases gas.

A further object of this invention is to provide a device for inflating a bag wherein particles of or masses of nongaseous combustible propellant employed for inflating the bag are trapped and entry into the bag is inhibited, and if such particles or masses escape from such trap, such particles or masses might be further trapped in an expansible chamber.

Another object of this invention is to provide a device, such as described, which retains the particles or nongaseous masses of propellant in two stages until the complete combustion thereof.

A further object of this invention is to provide a device of the class described which prevents molten propellant and residue from being discharged into the bag being inflated.

Still another object of this invention is to provide a device such as described which enhances thorough mixing of propellant.

Another object of this invention is to provide a device of the type described which is adapted to effect cooling of the propellant undergoing combustion.

A further object of this invention is to provide a device of the class described which is economical in construction and efficient in operation.

Other objects and advantages of this invention will be made apparent as the description progresses.

BRIEF DESCRIPTION OF THE DRAWINGS

In the accompanying drawings in which several of the various possible embodiments are illustrated.

Like parts are indicated by corresponding reference characters throughout the several views of the drawings.

DESCRIPTION OF THE PREFERRED EMBODIMENT

Figure 1:
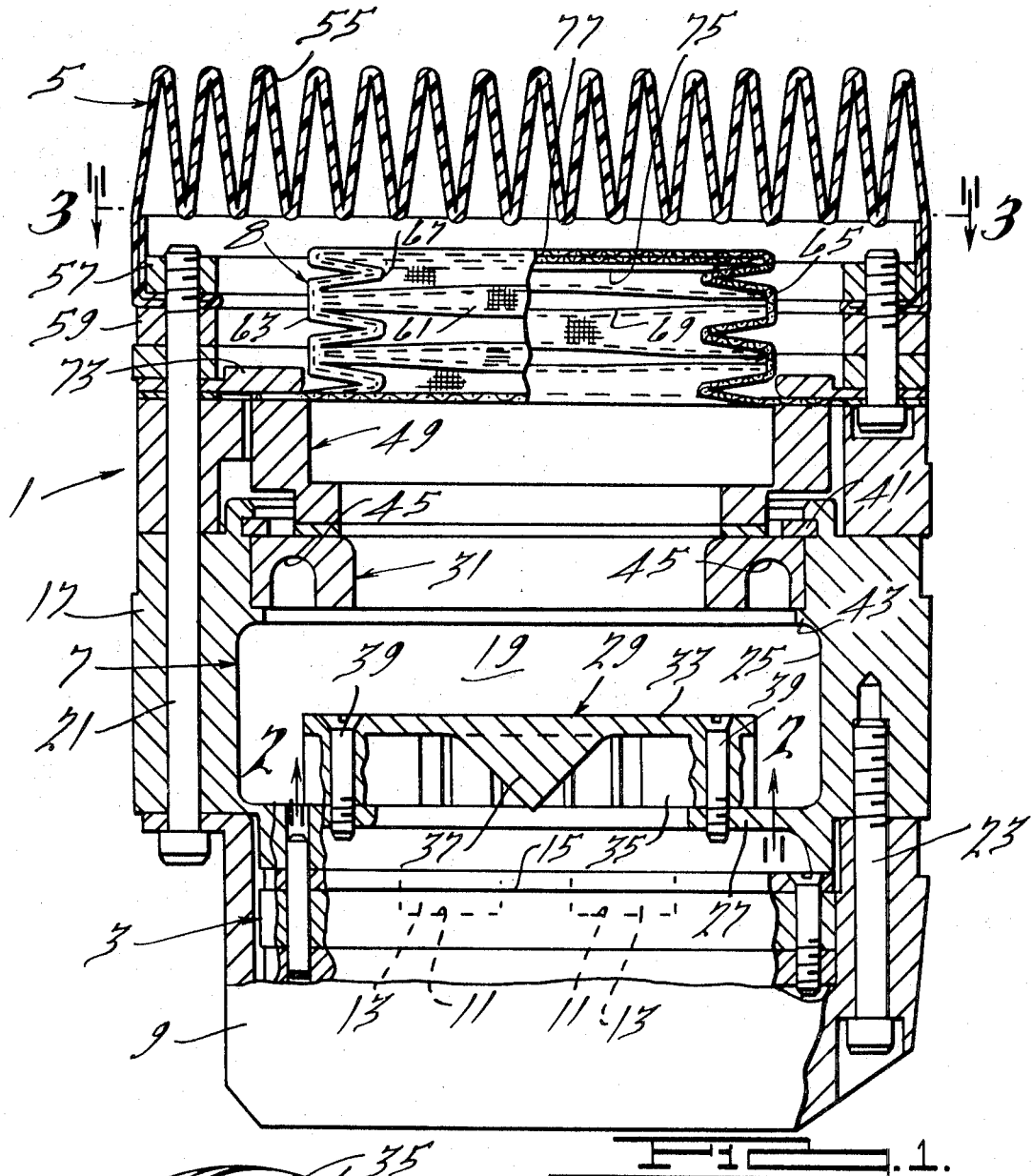
FIG. 1 is a side elevation of one embodiment of a device constructed in accordance with this invention, certain parts being shown in section.
Figure 2:
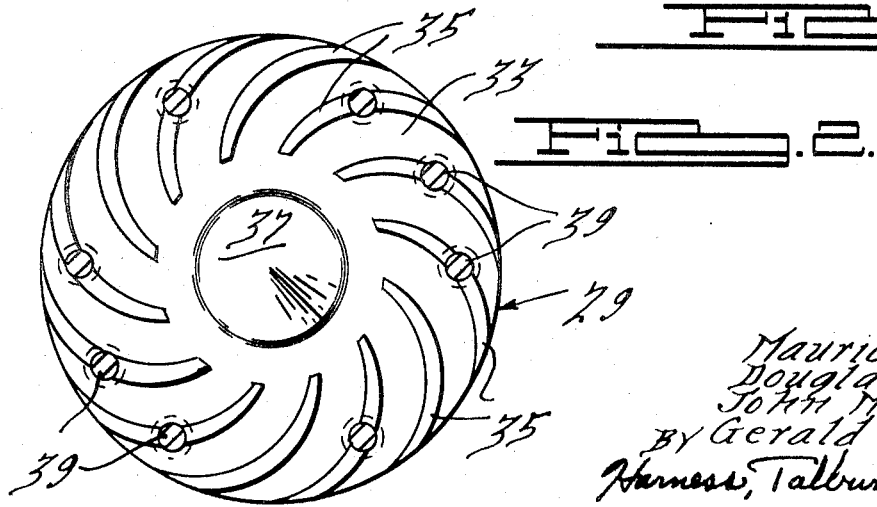
FIGS. 2 and 3 are sections taken along lines 2—2 and 3—3, respectively, of FIG. 1.
Figures 3, 4:
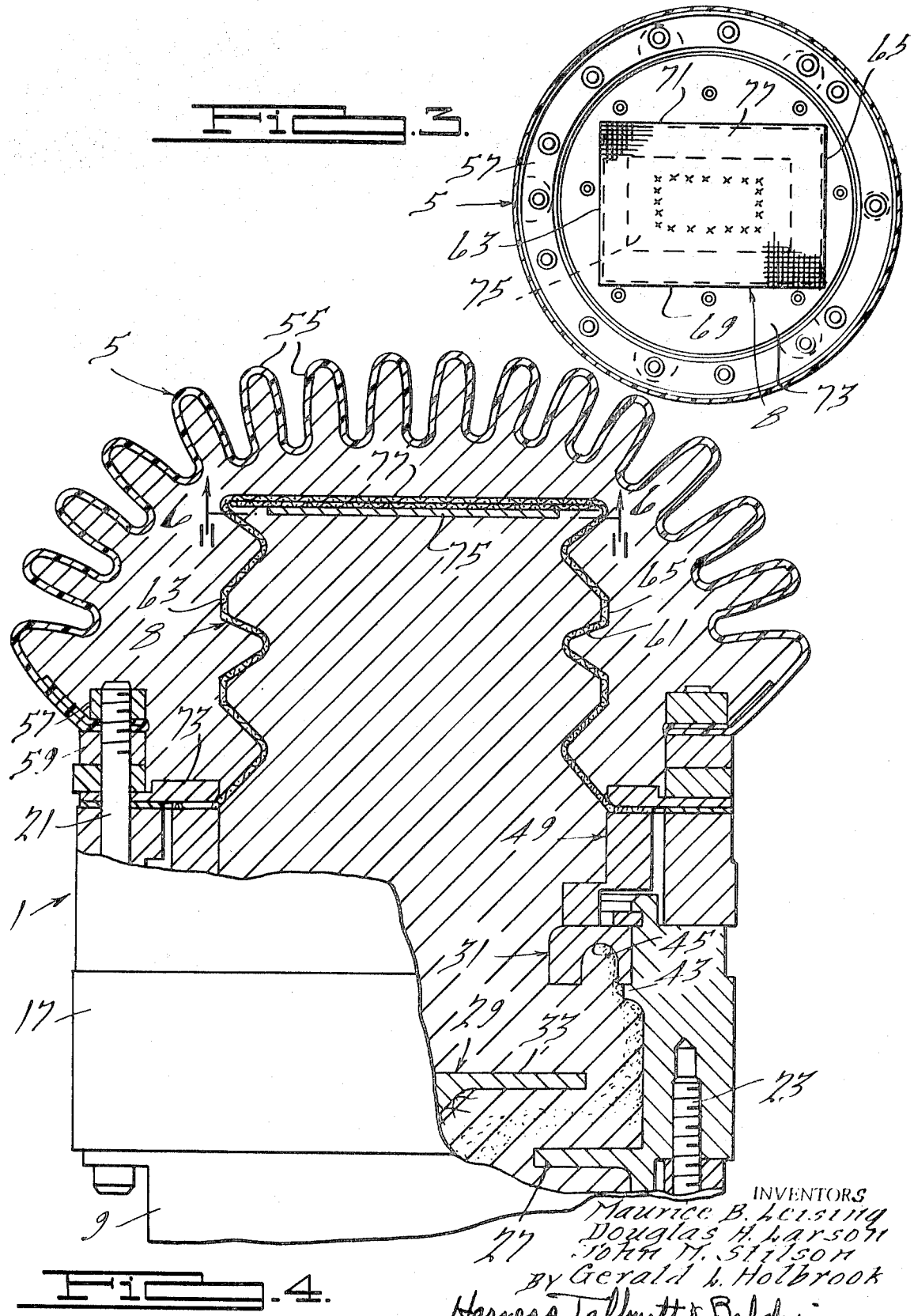
FIG. 4 is a view generally similar to FIG. 1 showing the device during initial stages of inflation of the bag.

Referring now to the drawings, a gas generating and inflatable bag device constructed in accordance with this invention is generally shown at 1. The device basically includes a gas generating or container section 3, an inflatable bag or gas confining means 5, a nongaseous matter trap and a diffusing and filtering device 8. More specifically, device 1 includes a housing 9 supporting generator 3. Generator 3 has one or more compartments 11 therein in which propellant 13 is stored.

Suitable ignition means (not shown) are provided for igniting the propellant in response to a signal from a sensor, indicative of a collision or deceleration of predetermined magnitude. The generator 3 and propellant 13 form a gas source. A suitable rupturable membrane 15 extends across the generator outlet to retain the propellant in the generator until propellant is ignited and sufficient pressure developed to rupture the membrane. The propellant may be of a type disclosed in copending application Ser. No. 746,333, i.e., black powder, which is adapted to ignite and burn within a few milliseconds, releasing gas in the process. The generator 3, including propellant 13, thus constitutes an inflation means.

Trap 7 includes a housing 17 having a central cavity or passage 19 therein. Housings 9 and 17 are connected together by a plurality of fasteners 21 and 23. The central portion of passage 19 is formed into a generally circular or looped material confining chamber or passage 25 by an inwardly extending ledge or shoulder 27, a directing means or deflector 29 at one end and a retaining ring 31 at the other end. In the form shown, the deflector 29 includes a plate member 33 having a plurality of curved deflecting vanes 35 extending away from one side thereof. As shown, the deflecting vanes 35 have a concave and a convex side with the radially inner end of each vane being located on a radial line relative to the center of the member 35 which is angularly separated from a radial line passing through the radially outer end of the vane, i.e., the inner and outer ends of each vane are angular offset from one another. It is desirable that the vanes be so formed that any gas and other material entering the space between the inner ends of two adjacent vanes are directed away from the deflector 29 in a direction which will cause the materials to travel outwardly to the outer wall of chamber 25 and thence along such wall around the chamber.

The plate 33 also has a generally cone-shaped diverting portion 37 extending away from the plate in the same direction as the vanes 35. Any gas or materials impinging on the cone are directed and deflected toward the vanes. The deflector 29 is located over the gas generator 3 and covers the opening formed by ledge 27. Fasteners 39 extend through plate 33 and some of the vanes 35 into threaded holes in ledge 27 to secure the deflector to the housing 17.

As noted previously, the chamber 25 is preferably circular. The annular ring 31 is clamped in a position adjacent the outlet from chamber 25 by a clamping ring 41. The ring 31 is seated on a shoulder 43. Ring 31 has an annular recess or trough 45 opening toward chamber 25. Particles which move up the wall of chamber 25 as the particles travel around the chamber will eventually move into trough 45 where as discussed hereinafter, they will be trapped until they are consumed by combustion.

If desired, a chamber 49 may be connected to the discharge side of trap 7. Chamber 49 may be filled with a supply of material, such as coolant, for example, adapted to react with the elements of combustion to affect the characteristics thereof. For example, a material such as disclosed in copending application Ser. No. 746,560, filed July 22, 1968, may be used if desired. Suitable retaining means, such as diaphragms 51 and 53 may be employed for retaining the material in the chamber 49. When the pressure within chamber 25 increases to a predetermined value due to the burning of propellant 13 and the release of gas, the diaphragms on chamber 49 will burst and permit the material within the chamber to mix with the burning propellant.

The inflatable bag 5 is folded in a manner to provide a plurality of folds 55 therein located side-by-side and extending generally away from the gas generator 3. The outer edges of the bag 5 are folded double and secured to the periphery of the device between two clamping rings 57 and 59. The clamping rings are connected to the body 17 by conventional fasteners 21.

The filtering device 8 comprises an expansible folded wire mesh screen 61. The screen 61 is shown to be generally in the shape of an inverted rectangular bottomed bag, two of the sides, 63 and 65 of which are provided with a plurality of elongated folds 67. The other two sides 69 and 71 are folded to accommodate the folds 67, i.e., the corners formed by the junction of the walls, are generally serpentine when viewed in a direction parallel to walls 63 and 65.

The lower edges of the walls 63, 65, 69 and 71 are clamped between a plate 73 and body 49. A diffusing or deflecting plate 75 is secured to the bottom 77 of the bag-shaped screen 61 for a purpose to be made apparent hereinafter. The screen 61 is expansible from the folded condition shown in FIG. 1 to the unfolded or extended position shown in FIG. 5 In its folded condition screen 61 is well within the confines of the folded bag 5. When expanded to its extended position, the screen is still well within the confines of the expanded gas filled bag.

Operation of the apparatus of this invention is as follows:

Assuming the various parts are in the position shown in FIG. 1, the propellant is initially ignited. Within a few milliseconds, a pressure sufficient to rupture the membrane or diaphragm 15 is attained and the diaphragm ruptures. The pressure of the gas released in the generator causes the propellant undergoing combustion to be discharged or propelled upwardly toward the deflector 29. The combustible propellant and the gas are directed toward the vanes 35 by cone 37 and also as a result of the pressure built up in the space between generator 3 and deflector 29.

As the propellant undergoing combustion and the gas move through the vaned section, the vanes direct all of the materials passing through the section toward the wall of chamber 25 at a point angularly spaced from the point at which such material exits from the vaned section. This causes the materials to travel in a generally circular path after they reach the wall of the chamber. This also causes the materials undergoing combustion and the materials which are not yet undergoing combustion to mix, thereby enhancing combustion of the propellant. The gas passing through the vane section into the chamber 25 is forced, due to the increase of pressure behind such gas, from the chamber and up through the opening in ring 31 and through the chamber 49 into the filter and diffusing member 8 and then into the bag 5. If chamber 49 is provided with a supply of coolant material, for example, such coolant material will be mixed with the gas as the latter ruptures the diaphragms 53 and 51 and inflates the bag.

The particles, globules and pieces of burning propellant emerging from the vaned section of deflector 29 will move in a substantially straight line, due to their inertia, to the wall of chamber 25, and ten travel around the wall of the chambers as they are consumed. Due to their mass and velocity the reacting particles are kept in the chamber until they are converted to gas. As more and more gas and reacting particles of propellant emanate from the deflector 29, and since some reacting particles may emanate from the deflector 29 on a path inclined upwardly relative to the ledge 27 and hence tend to spiral upwardly, many globules and particles may be forced and move upwardly along the wall of chamber 25 into the trough 45 where they are retained until they are converted to gas or until the bag is in an inflated condition.

If any nongaseous propellant should escape the trap 7, the pressure of the gas released in the generator causes such nongaseous propellant to be propelled or thrown outwardly into the chamber formed by the screen 61. The gas released by the propellant undergoing combustion passes through the wire mesh screen and begins to inflate the bag. In addition, since the wire mesh offers some resistance to the flow of gas from the generator 3, the gas causes the pressure within the filter to rise, thus tending to inflate or expand the inverted bag-shaped filter. As the filter beings to expand it may engage the inflatable bag and help deploy the latter.

As mentioned, any propellant thrown or propelled out of the trap 7 is propelled into the chamber formed by the screen 61. A substantial portion of the propellant is consumed before it reaches the wire mesh of the screen or the deflection plate 75. This propellant merely releases gas which passes through the wire mesh or impinges on plate 75 and is deflected laterally through the wire mesh into the inflatable bag. However, some of the particles of or masses of molten propellant may not be completely consumed by the time they reach the screen or deflection plate 47. If the particles undergoing combustion were permitted to contact the inflatable bag walls they could have a deteriorating effect on the bag. If the particles are smaller than the mesh openings, any burning particles will be too small to cause significant deterioration of the bag walls, even if such particles are not consumed before they reach such walls. However, most particles will be completely consumed within a short distance from the screen. When hot particles which are larger than the mesh openings are propelled into the chamber, they are prevented by the filter from entering into the interior of the bag. The particles apparently either impinge upon deflection plate 75 and are diverted laterally to the screen walls or the particles impinge directly upon the screen walls. The large particles are prevented by the screen from passing therethrough until they are smaller than the openings therein. Also, as the large particles or masses impinge upon the deflection plate 75 they are directed back toward the trap 7 or toward the screen, where they continue to be consumed. In any event, the particles must be consumed to such an extent that they will not have a deleterious effect on the bag walls before they pass through the filter screen and impinge on the walls, and will not be large enough to create a hazard to an occupant if the bag should burst.

In addition to the deflection and filtering of hot and/or propellant particles undergoing combustion, the plate 47 and the screen diffuse and distribute high-velocity gases in the bag. This is an important aspect of this invention and promotes rapid and even inflation of the bag. Moreover, the screen and plate absorb heat from the hot gases, thus aiding in the reduction of the temperature to which the bag walls are subjected.

Figure 5:
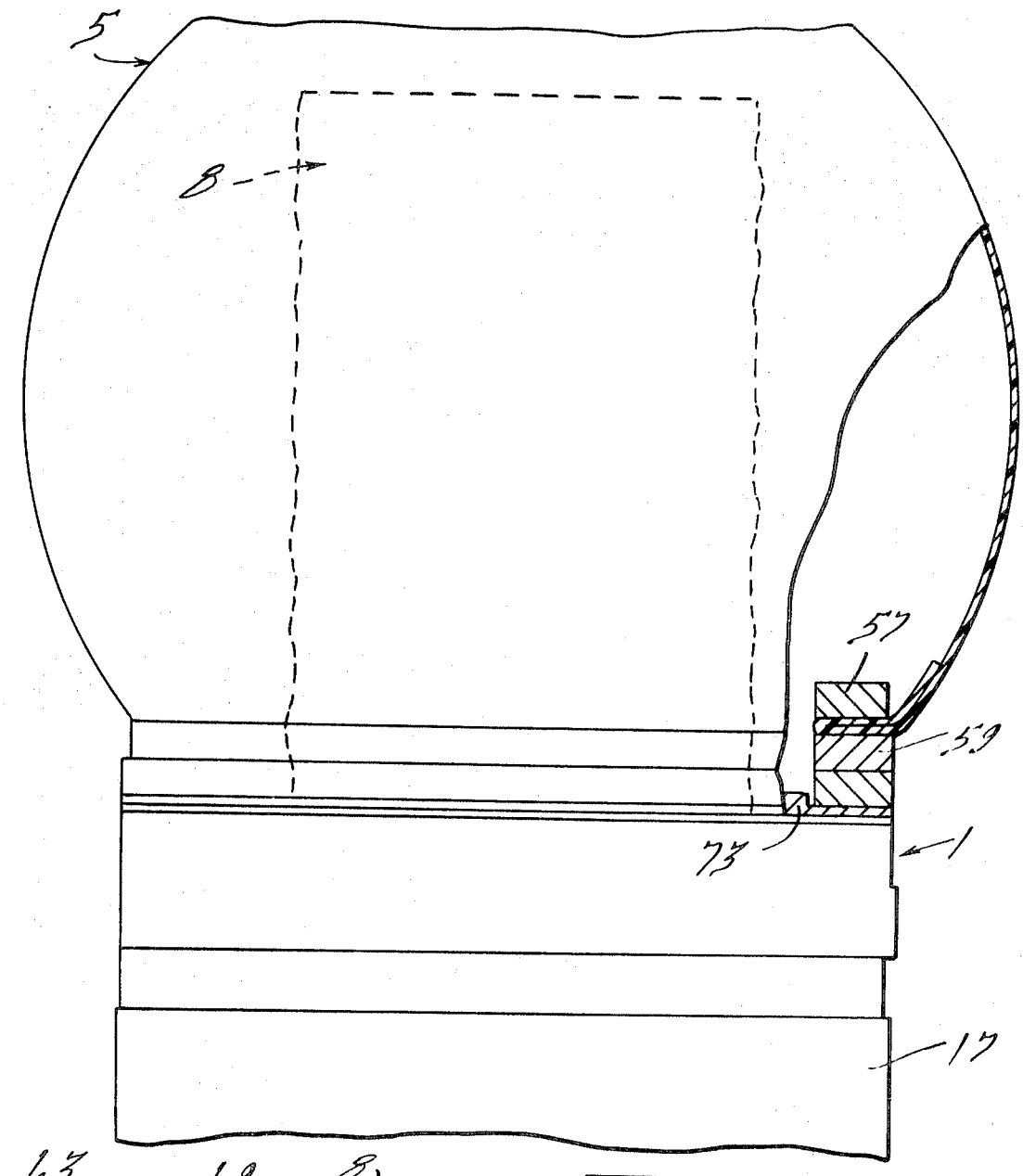
FIG. 5 is a view generally similar to FIG. 3 showing the device during the final stages of inflation.
Figure 6:
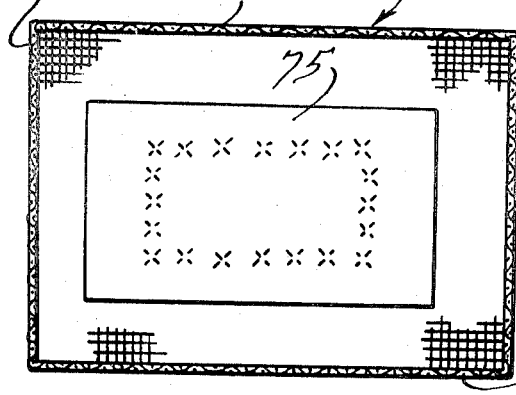
FIG. 6 is a section taken along line 6—6 of FIG. 4.

When the bag is fully inflated, the filter 8 has itself been expanded or inflated to the position shown in FIG. 5. If the bag should be deflated beyond a predetermined amount due to the impact of a vehicle passenger and the action of a pressure relief means, not shown, such as a relief valve or blowoff patch, for example, the erected filter 8 will readily collapse rather than remain rigid. The collapsing filter will, of course, absorb a small amount of energy during its collapse.

It will be understood that the above described action is somewhat theoretical since the whole process of burning and inflation takes place in a very short period of several milliseconds and an actual recording of the events occurring within the chamber is difficult to accomplish. However, the apparatus was designed to provide such occurrences as above described and inspection of units and interpretation of the physical indicators left on a unit after an inflation operation indicate that the above described sequence of events does apparently occur.

It will be seen that the device described prevents particles or parts of propellant from moving directly from the generator to an inflatable bag, the particles being caught in a trap until they are substantially converted to gas. Moreover, the deflector 29, chamber 25 and expansible filter 8 enhance thorough mixing and hence complete combustion of the propellant.

In view of the foregoing, it will be seen that the several objects of this invention are achieved.

While only one embodiment of the invention has been disclosed and described, it is apparent that other embodiments and modifications of the invention are possible.

We claim:

1. An inflatable device comprising an inflation means, container means for holding said inflation means, an inflatable means connected to said container means, means for releasing said inflation means from s aid container means for inflating said inflatable means, and confining means adjacent said container means, said container means including means for directing said inflation means into said confining means in a direction to enhance movement of said inflation means around said confining means, and movable filter means in the path of a portion of said inflation means after the latter is discharged from said confining means for filtering and altering the path of movement of said inflation means.

2. An inflatable device as set forth in claim 1 wherein said confining means comprise a generally loop-shaped chamber, and said movable means comprises screen means adapted to expand in response to release of said inflation means from said container means.

3. An inflatable device as set forth in claim 2 wherein said confining means further comprise a retaining means for inhibiting movement of said inflation means out of said chamber, said retaining means including a trough means located between said chamber and said screen means.

4. An inflatable device as set forth in claim 1 wherein said directing means comprises a plurality of vanes for directing said inflation means into said confining means in a direction to enhance movement of said inflation means therearound, said movable means comprising an expansible screen chamber having a first folded condition and a second expanded condition, said inflation means causing said screen chamber to expand from said first condition to said second condition.

5. An inflatable device as set forth in claim 1 wherein said container means includes a gas generator body, said inflation means including propellant in said body adapted to release gas, said propellant being discharged from said generator in a gaseous state and a nongaseous state, said directing means causing heavier masses of said propellant to move to the outside of said confining means while permitting said propellant in a gaseous state to escape from said confining means, said movable means comprising an expansible chamber located between said confining means and said inflatable means and adapted to expand in response to the deliverance of propellant thereto, said chamber comprising a filter adapted to filter the propellant as it passes from said confining means to said inflatable means.

6. An inflatable device comprising a gas generator, an inflatable bag connected to said gas generator, propellant in said gas generator adapted to release gas when ignited, said propellant being discharged from said gas generator in a gaseous and nongaseous state when initially ignited, confining means adjacent said gas generator, directing means located between said gas generator and said confining means, said directing means including a plurality of vanes for directing the propellant, both in the gaseous and nongaseous state, discharged from said gas generator into said confining means, an expansible filtering means located between said confining means and said bag, said expansible filtering means comprising a hollow screen device, at least one fold extending around the periphery thereof, said hollow screen device having a collapsed folded condition and an expanded unfolded condition.

7. An inflatable device comprising a gas generator, an inflatable bag connected to said gas generator, propellant in said gas generator adapted to release gas when ignited, said propellant being discharged from said gas generator in a gaseous and nongaseous state when initially ignited, confining means adjacent said gas generator, said confining means being generally loop-shaped, directing means located between said gas generator and said confining means, said directing means including a plurality of vanes for directing the propellant, both in the gaseous and nongaseous state, discharged from aid gas generator into said loop-shaped confining means in such a manner as to enhance movement of said propellant around said confining means, the heavier masses of propellant in a nongaseous state moving to the outside of the confining means while the lighter propellant in a gaseous state escapes therefrom, an expansible filtering means located between said confining means, and said bag, said expansible filtering means comprising a hollow screen device having a plurality of folds extending around the periphery thereof, said hollow screen device having a collapsed folded condition and an expanded unfolded condition, said propellant upon being discharged from said confining means forcing said hollow screen device from its collapsed folded condition to its expanded unfolded condition, said hollow screen device filtering the propellant and preventing ignited masses of propellant larger than the openings in said screen device from passing into said bag.

8. An inflatable device as set forth in claim 7 further including retaining means, said retaining means comprising trough means located between said confining means and said hollow screen device, said trough means having an opening therein through which propellant passing from said confining means to said hollow screen device passes.

* * * * *